United States Patent [19]

Caulier et al.

[11] 3,721,820

[45] March 20, 1973

[54] COMPUTING CAR LOCATIONS IN A TRAIN

[75] Inventors: Paul W. Caulier, Greenwood; Donald W. Greene, Fishersville, both of Va.

[73] Assignee: General Electric Co., Salem, Va.

[22] Filed: Nov. 17, 1971

[21] Appl. No.: 199,687

Related U.S. Application Data

[63] Continuation-in-part of Ser. No. 14,574, Feb. 26, 1970, Pat. No. 3,646,343.

[52] U.S. Cl. .................246/247, 177/163, 246/77
[51] Int. Cl. .............................B61l 1/16, G06f 7/02
[58] Field of Search ...246/77, 247; 340/23; 177/163, 177/DIG. 8

[56] References Cited

UNITED STATES PATENTS 3,500,039    3/1970    Kortyna.................................246/77

Primary Examiner—Robert G. Sheridan
Assistant Examiner—George H. Libman
Attorney—Arnold E. Renner et al.

[57] ABSTRACT

A novel method and apparatus is disclosed for measuring the successive distances between the wheels of cars in a train and processing said measurements to locate a given axle of a car, such as the first axle of a truck of a car or the first axle of the car.

8 Claims, 7 Drawing Figures

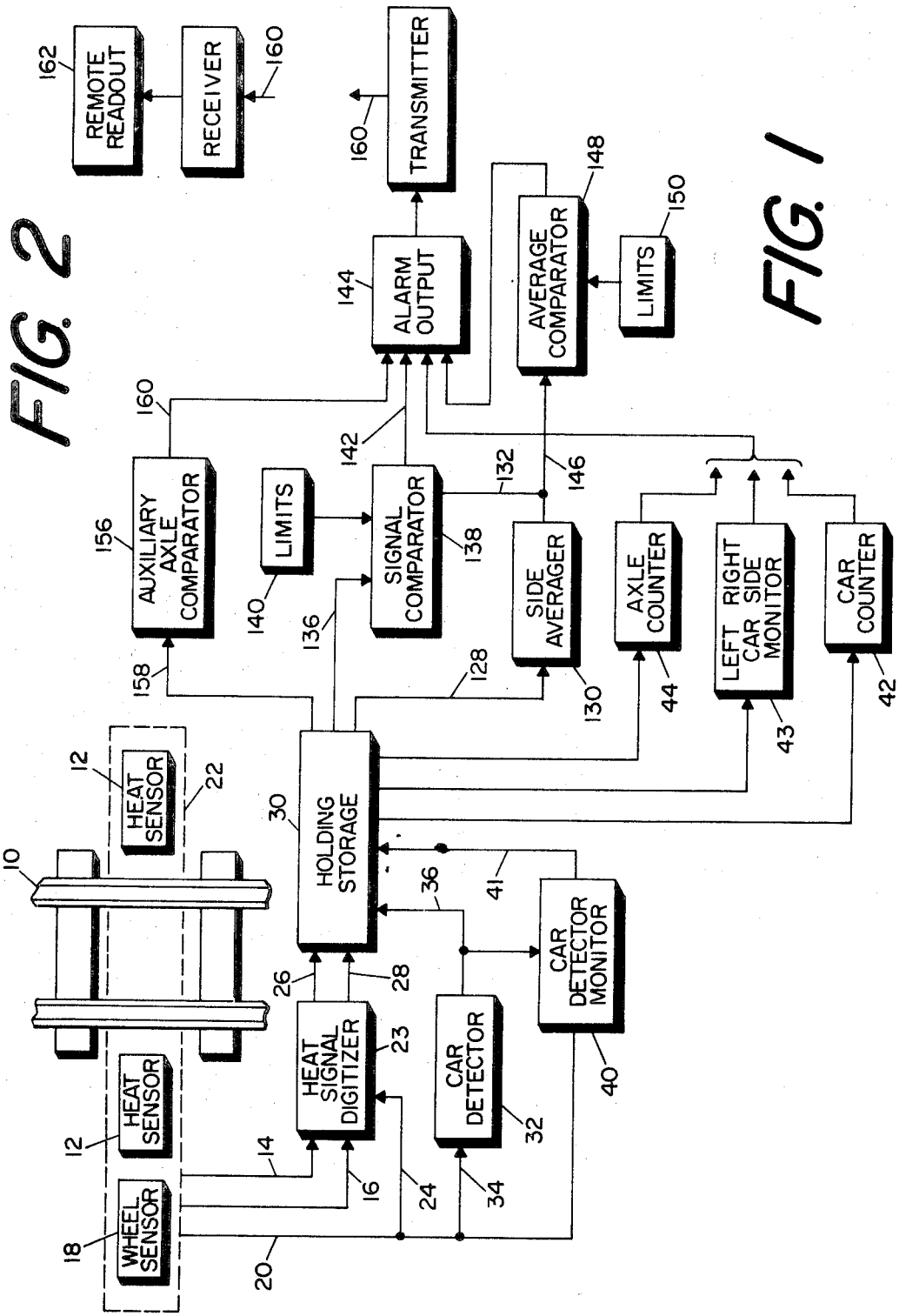

COMPUTING CAR LOCATIONS IN A TRAIN

This is a continuation-in-part of application Ser. No. 14,574 filed Feb. 26, 1970, now U.S. Pat. No. 3,646,343 issued Feb. 29, 1972.

BACKGROUND OF THE INVENTION

This invention relates to arrangements for identifying the passage of the wheels of a train of cars and particularly to methods and apparatus for identifying the passage of the first wheel of a truck or the first of a car in the train.

The need for such method or apparatus finds a primary application in connection with apparatus for detecting hot journal bearings, that is, hot boxes on a passenger railroad train. In a separate application, Ser. No. 14,574, filed Feb. 26, 1970 in the names of Paul W. Caulier and Donald W. Greene, and assigned to a common assignee, of which this is a continuation-in-part application, the background of hot box detection is described in detail and an improved method and apparatus claimed for identifying hot boxes with great accuracy and high reliability.

Typically, hot box detectors comprise a heat sensor such as a thermocouple or thermocell disposed at a track site along both sides of the rail. Such detectors have a sighting axis which intersects the passing journal boxes such that the heat generated therein can be monitored. Ideally, each sensor serves to detect the heat generated by the individual passing journal box. Thus, each box as it passes the detector generates a signal having an amplitude proportional to the temperature rise of that box with respect to some reference value. The previously mentioned application describes an improved arrangement for evaluating heat signals to indicate the presence of a hot box. To detect hot boxes, separate sensors are provided for each train side. An average temperature value for each side of the passing car is derived from the sensed or monitored temperatures. Comparison is then effected between the temperatures of the individual journal boxes disposed on a given car side and any deviations above predetermined limits are utilized to signify the presence of an alarm condition.

After the presence of a hot box condition has been accurately detected and reliably evaluated, any alarm condition must still be correlated to a particular car and wheel. The typical prior-art system, however, is largely inadequate in this respect as such systems normally are operative only to indicate the number or "count" of the axle from either the front or the rear of the train at which a hot box exits. Thus, once an alarm condition is detected and the axle information given to the train crew, the train must be stopped and the train crew must walk to the car at which the hot box exists, counting axles along the way from either the front or the rear of the train. Since a manual counting of axles must actually be effected in many of the prior-art techniques, counting errors are easily possible and thus the overall adequacy of the hot box detecting systems is markedly reduced.

In summary, then, the prior-art techniques are deemed deficient as concerns the actual evaluation of hot boxes and identification of any defective cars.

SUMMARY OF THE INVENTION

A need thus exists in the art for an improved method and apparatus for identifying the passage of the wheel axles of the cars of a train. It is the primary object of the instant invention to provide such a method and apparatus which satisfies this need.

Further, more specific yet equally important objects of the instant invention concern:

a. Providing an improved measurement method and apparatus.

b. Providing a novel method and apparatus wherein wheel axles are identified from measurements of the distances between passing wheels.

c. Providing improved wheel identification of the passing cars in a train.

These objects, as well as other objects which will become apparent as the description proceeds, are implemented by the novel invention which, from a broad standpoint, will be seen to comprise both a novel method and apparatus for locating the wheels of the passing cars in a train.

In accordance with the novel invention concepts, there is provided an arrangement for detecting the passage of a train of cars moving past a given point wherein each car comprises a plurality of trucks with each truck comprising a plurality of axle bearing wheels, said arrangement comprising the steps of measuring the distance between successive wheels of the car in said train in response to the passage of the wheels past a given point; providing a first signal representative of the passage of the first axle of each truck comprising subtracting each measured distance from the preceding measured distance and generating said first signal in response to the value of each subtraction having a given, one polarity; and providing a second signal representative of the passage of the first axle of a car comprising subtracting each said first signal from the preceding first signal and generating said second signal in response to the value of each subtraction having a given polarity opposite to said one polarity.

The novel invention further includes a means for correlating the presence of an alarm condition signifying a detected hot box, with a particular car and wheel, this correlation also being effected in a completely automatic fashion. In this respect, the novel invention incorporates means which serve to detect either the center or the end of a passing car and to generate a "car" signal in response thereto. This signal is utilized to effect various transfer operations of the individual heat signals derived from the passing journal boxes of the car in a fashion to be discussed in more detail hereinbelow.

In the preferred inventive embodiment, the hot box information, i.e., the presence of an alarm condition and the particular car, wheel and side at which the alarm condition has occurred, is then forwarded or enunciated to the train crew and preferably to the engineer of the train such that the train crew can readily correct the defective conditions and keep the down time of the train at a minimum.

BRIEF DESCRIPTION OF THE DRAWINGS

The invention itself will be better understood and further features and advantages thereof will become apparent from the following detailed description of a preferred inventive embodiment, such description making reference to the annexed drawings, wherein:

FIG. 1 is a functional block diagram schematically representing the novel hot box detection system of the aforementioned parent application;

FIG. 2 is a schematic block diagram illustrative of the remote readout device utilized with the novel not box detection system of the parent application;

DETAILED DESCRIPTION OF A PREFERRED INVENTIVE EMBODIMENT

Figures 3A, 3B, 3C:
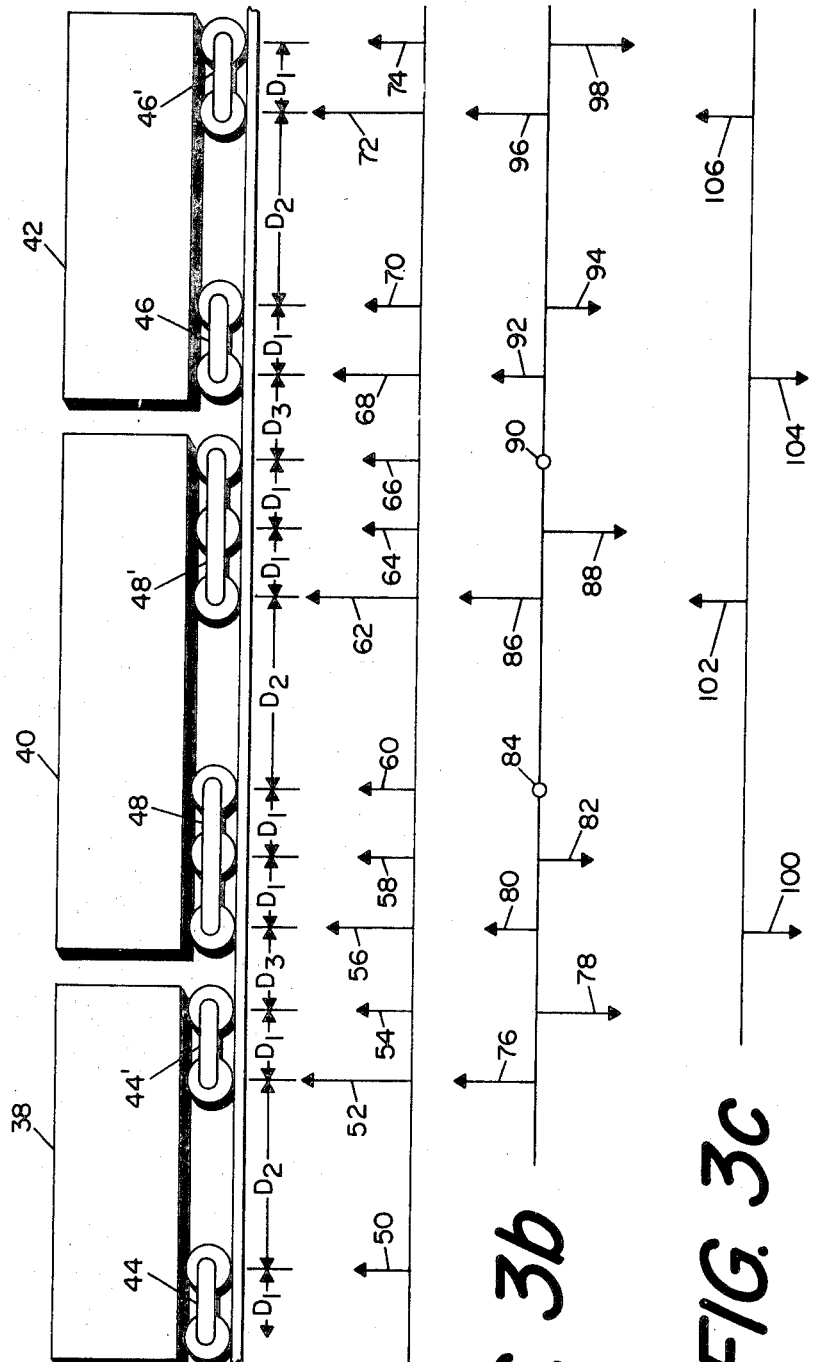
FIGS. 3a, 3b, and 3c are schematic representations of a digital technique utilized to detect individual cars of the passing train so as to correlate individual wheel signals with particular cars.

The present invention finds particular application in conjunction with the system of the previously identified U.S. Pat. No. 3,646,343 which comprises a technique wherein an average temperature signal is derived from a plurality of journal boxes disposed on one side of each car, and the signal individual to each journal box of that car side is compared to the average signal value. This technique in and of itself represents a totally new approach in the art of automatic evaluation and, as has been alleged, serves to effectively eliminate all non-critical side dependent variables from the actual heat monitoring of the passing journal boxes. Now, it should be understood that a hot box sensor or detector will produce a heat signal for each wheel, the value of such signal depending upon the number of parameters.

For example, the output of the sensors of the novel detector system can be shown to depend upon (1) the heat absorption from external sources such as the sun $f(a)$ (2); a heating due to motion or speed of the car $f(v)$; (3) a heating due to loading of the car $f(v)$; (3) a heating due to loading of the car $f(L)$; (4) the bearing heating factor $f_b$ which increases when a hot box develops; (5) the heat loss into the side frame of the truck $f(h)$; (6) the heat loss due to winds unrelated to train motion $f(W)$; (7) the heat loss due to drive wind $f(V_W)$; (8) the changes in bearing position relative to the hot box detector caused by changes in wheel size $f(P)$; (9) the changes due to view or line of sight adjustment of the scanner $f(A)$; (10) the changes due to attenuation of the optical path due to dust, dirt, snow, etc. $f(g)$; (11) the changes due to the gain of the detector unit $f(G)$; (12) and the changes due to variation in the detector frequency response $f(S)$.

Now, it should be understood that the heat absorption from external sources $f(a)$, the heating due to loading $f(L)$, the heating loss due to winds unrelated to train motion, such as cross winds, $f(W)$, the changes due to the adjustment and line of sight of the scanner $f(A)$, the changes due to variations in the detector frequency response are all variables which primarily depend upon and are functionally related to one or the other of the two car sides. Thus, it is desirable to derive an average signal from a plurality of wheels on one side of each car, and preferably from all wheels at one side of each car, and to compare each individual wheel of that car side in a suitable manner to the derived average signal value. In this fashion, a comparison can be utilized, such as a ratio comparison, for obtaining a result which is nearly independent of all variables and thus the detector output would, in effect, be a reliable criterium of the presence of an alarm condition.

Expressed mathematically, it can be seen that the ratio output of the detecting apparatus equals:

$$(1) = \frac{f(a) + (f(v) + f(L))f_1(b) - [f(h) + f(W) + f(V_w)]f(P)}{\frac{1}{n}[n \cdot f(a) + (f(v) + f(L))[f_1(b) + \ldots + fn(b)] - n[f(h) + f(W) + f(V_w)]f(P)}$$

assuming that only $f(b)$ varies significantly between normal and hot bearings. Now, this expression reduces to:

$$(2) = fl(b) \cdot n/fl(b) + \ldots + fn(b)$$

making the justified assumption that the quantity $$f(a) - f(h) + f(W) + f(V_w)]f(P)$$

is small compared to the quantity $1/n [f(v) + f(L)](fl(b) + \ldots + fn(b))$

The detector output will be 1 if the one wheel signal $f_1$ (b) equals the average wheel signal. In the previous equations, $n$ = number of axles of one car and $f_1$ (b) = factor $f_b$ of the first wheel of one car side.

An examination of equation (1) verified that each heat signal depends on variables which are unique for that train side and that sensor.

Comparing one such heat signal to the average of one car side and dividing by the average produces equation (2), after standard mathematical manipulations. It is significant that all the side dependent factors $f(P), f(A), f(g), f(G)$ and $f(S)$ vanished from the equation. This is the advantage of taking a ratio although other comparison techniques can also be used.

Equation (2) now is the mathematical expression of the alarm criterium of the novel inventive technique when comparing one heat signal (of bearing A1) to the average of that train side.

Expressed in a different fashion, the novel technique of this system is such that the temperature $t_x$ of each of a plurality $n$ journal boxes disposed on one side of a car is monitored to obtain a plurality of separate quantities $t_x$ ($x=1, \ldots n$). Then, the quantity $$A = 1/n \sum_{x=1}^{x=n} t_x$$

is obtained. If a ratio comparison is desired, separate quantities are then obtained, $B_x = t_x/A$ where ($x=1, \ldots n$) and, each quantity $B_x$ is then compared with a reference or limit quantity and an alarm is selectively generated in dependence upon this comparison. An alternative method of comparison, where division is expensive or slow, is to determine the difference between each wheel temperature and the average temperature of all wheels (or given plurality of wheels) on the same side of the same car. This temperature difference may be represented by the following expression:

$$\Delta t_n = t_n - \frac{1}{n} \sum_{x=1}^{x=n} t_x$$

From an apparatus standpoint, this technique is effected by providing a sensor means which is responsive to the temperature of the journal boxes on the cars of a passing train. The sensor means is contemplated to feed into an evaluator means which is coupled thereto for producing an output which would be representative of the comparison made between the temperature of a journal box on a given side of a car and the average temperature value of all journal boxes disposed on the given car side, such comparison preferably being of the ratio type although other comparison techniques are also suitable. Finally, comparison means would be provided for comparing the evaluator output with a reference or limit value and for selectively producing an alarm indication therefrom.

Referring specifically now to FIG. 1 of the drawings, the actual track site equipment contemplated to be utilized with the novel inventive system is depicted. A typical railroad track is designated by reference numeral 10 and, to either side of the railroad track, sensing units 12 are disposed. These sensing units are contemplated to comprise infrared heat detectors having a sight axis intersecting the journal boxes of a passing train.

Now, as each journal box of the passing train goes by the associated sensor 12 disposed to either the right or the left of the track 10 at desired locations to properly view the passing journal as indicated by the wheel sensor indicating wheel passage, sensors 12 respectively serve to generate an analog voltage signal on lines 14 and 16, the value of this signal being proportional to the magnitude of the heat actually sensed. At the same time, as each axle or wheel goes by, a pulse is produced by a wheel sensor 18 on line 20. Heat sensors 12 and wheel sensor 18 form a conventional hot box detector unit generally designated 22 such as the General Electric Hot Box Detector Model 3S7516HB.

The analog voltage signals on lines 14 and 16 proportional to the heat of the journal boxes to either side of a single passing axle form the input to a heat signal digitizer 23 which serves to convert the analog voltage signals from each of the sensors 12 into digital signals preferably of a binary nature. The analog-to-digital conversion within the heat signal digitizer 23 takes place in synchronism with the wheel pulse generated on line 20 and input as a gating signal into the heat signal digitizer 23 via line 24. In the preferred inventive embodiment, the heat signal digitizer 23 comprises a conventional gated analog-to-digital converter and incorporates two channels for the right and left heat signals generated on lines 14 and 16, respectively, by the heat sensors 12.

As each axle or wheel of the car passes by the hot box detector 22, the respective analog voltage signals generated and converted into digital signals are then serially discharged into a holding storage means 30 along lines 26 and 28. Again, in the preferred inventive embodiment, holding storage means 30 preferably comprises two separate storage devices such as shift registers so that the heat signal from the right side of the car and the heat signal from the left side of the car respectively carried along lines 26 and 28 are maintained separately. If desired, however, and as should be apparent to those skilled in the art, a single output channel could be provided and the right and left heat signals separated on a serial time sharing basis. Holding storage means 30 thus, at any one time, will contain a plurality of digital signals representative of the journal box heat of a number of axles that have passed by the hot box detector 22.

In accordance with the novel invention, the digital heat signals stored in the holding storage means 30 are correlated with a particular car that has passed by the heat detector 22. This correlation must take place since, as described at the outset of the specification, the novel inventive method and apparatus essentially serves to analyze the heat signals generated by each respective car and furthermore, serves to separately analyze the heat signals generated by the journal boxes disposed on each side of the respective car. Thus, a car detector means 32 is provided into which the wheel or axle pulses from wheel counter 18 are fed via lines 20 and 34. The output of the car detector means 32 is contemplated to comprise a gating pulse on line 36 representative of the passing of a single car, this gating pulse serving as a transfer signal for the holding storage means 30. In this fashion, a plurality of digital heat signals equal to the number of journal boxes disposed on a respective car are stored in the holding storage means 30 and, upon the presence of the transfer signal from car detector means 32 via line 36, the plurality of stored signals are then subsequently analyzed in a fashion to be described hereinbelow. The process serves to repeat itself as will be apparent on a car-by-car basis.

The car detector means 32 and particularly its functional operation in and of itself constitutes a novel and advantageous approach in the art. It is for this reason that it would be useful at this point to digress from the description of the overall system and to describe in more detail the structure and operation of the car detector means 32. In this respect, attention is directed to FIG. 3 of the drawings from which the novel operation of the car detector means 32 can be understood.

In FIG. 3, a plurality of railroad cars are designated by reference numerals 38, 40 and 42, respectively. As shown, each car is seen to include two trucks, cars 38 and 42 utilizing two-axle trucks 44 and 44', and 46 and 46', respectively. On the other hand, car 40 is seen to utilize three-axle trucks 48 and 48'. Thus, cars 38 and 42 each include four wheels to a side while car 40 includes six wheels to a side. Now, D1 depicts the distance between axles of the same truck on each car, D2 depicts the distance between the last wheel of the first truck and the first wheel of the second truck on each car, and, D3 depicts the distance between the last wheel of one car and the first wheel of the next adjacent car. For a given combination of cars and adjacent distances, it will be seen that the following relationship is true: D1 is less than D3 is less than D2. If the train is running at substantially constant speed, the elapsed times in covering these respective distances as indicated by identical subscripts will form the following inequality:

$$T_1 < T_3 < T_2$$

In the following discussion using distances it should be understood that at substantially constant speed, the respective time measurement values may be used.

These various distances are depicted on chart 3a as upwardly directed lines 50 through 74, the magnitude or length of these lines being representative of the various distances D1, D2, D3. Thus, line 50, for example, illustratively depicts the value of distance D1 between the axles of truck 44 of car 38.

Referring now to chart 3b, a plurality of schematically represented lines 76 through 98 are illustrated. Each of these lines are representative of the mathematical difference between adjacent distances as depicted by the lines on chart 3a. Thus, for example, line 76 on chart 3b has a value representative of the difference between line 52 and line 50 on the chart 3a, or the value of line 52 minus the value of line 50. Similarly, line 78 on chart 3b has a value, negative in this case, representative of the value of line 54 minus the value of line 52 in chart 3a. Similarly, line 86 in chart 3b represents the value of line 62 from which the value of line 60 has been subtracted on chart 3a.

Going one step further and referring now specifically to chart 3c, the lines thereon depict the values obtained by taking the differences between only the positive or upwardly directed lines 76, 80, 86, 92 and 96 of chart 3b. Thus, the value of line 100 which extends downwardly and thus, by convention, is negative, represents the value of line 80 from which the value of line 76 in chart 3b has been subtracted. Line 102 represents the value of line 86 from which the value of line 80 has been subtracted. Line 104 represents the value of line 92 from which the value of line 86 has been subtracted. Finally, line 106 represents the value of line 96 from which the value of line 92 has been subtracted.

Now, as should be apparent, it will be noted that all positive values, i.e., 102 and 106, obtained on chart 3b, represent the first wheel of the last truck of each car. Similarly, all negative values 100 and 104 of chart 3c represent the first wheel of the first truck on each car. Accordingly, by merely taking the negative values, for example, one line is obtained for each car and this line is representative of the output generated by the car detector means 32. Each negative value signal is then used to initiate computation of data accumulated during passage of the previous car. The positive value pulses are ignored.

To summarize the above concept, the distances between the various wheels of the passing cars are plotted and the differences between a given distance and the preceding one are taken so as to obtain either positive, negative or zero values in synchronism with the measurement of the given distance. Now, only the positive values (i.e., 76, 80, 84, 86 . . . of FIG. 3b) thus obtained are next considered. Specifically, the differences between each positive value and the preceding value are taken and, from such differences, positive and negative values (see FIG. 3c) are obtained. Importantly, however, only a single positive and a single negative value are obtained and at a specified location on the car. Thus, by monitoring negative values, for example, one signal will be produced upon the passage of each car of the train, this signal being utilized as a transfer or gating signal, as discussed. As a check to insure proper operation of the wheel detector, i.e., to recognize missed wheels, the output of the car detecting means 32 is monitored to assure that only even numbers of axles per car and cars with at least four axles are recognized.

Car detector monitor, which may comprise a counter, responds to the signals, i.e., wheel pulses, over 20 to count up the number of axles sensed at the indication of the end of car signal on 36, the number stored in the counter indicates whether the number of axles counted is odd or exceeds a given number such as eight axles. If such a fault indication is produced, a signal is transmitted over 41 to holding storage circuit 30 to block transmission of signals from 30 to 130 and 136 and to apply signals to 156 to actuate comparator 156 to perform the alternate temperature algorithm to be described.

Figure 4:
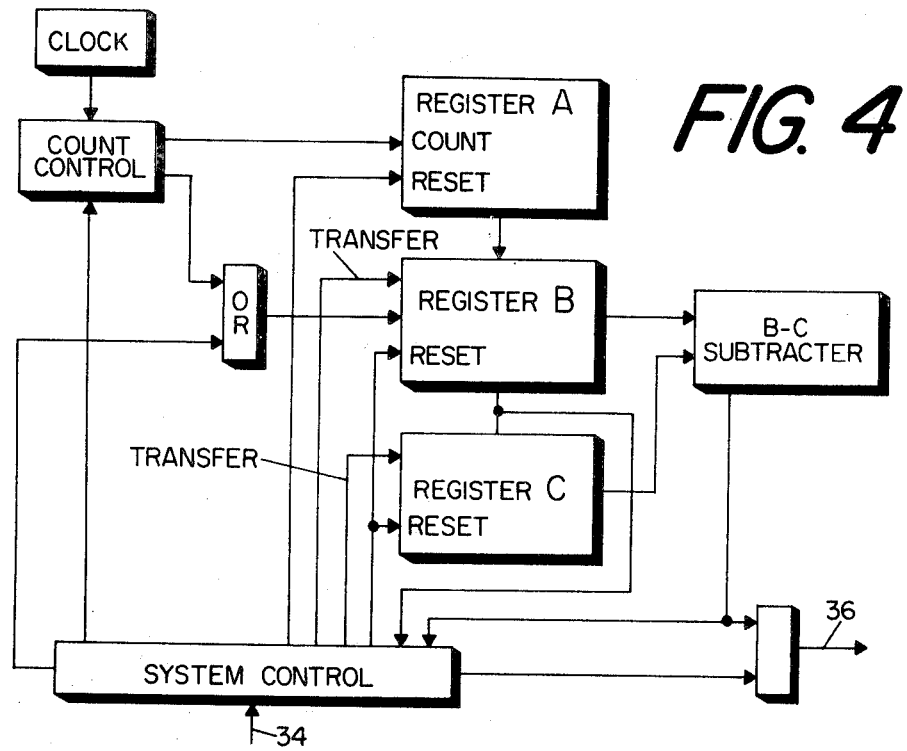
FIG. 4 is a functional block diagram of a novel car detector apparatus utilized with the overall hot box detection system of the invention.
Figure 4A:
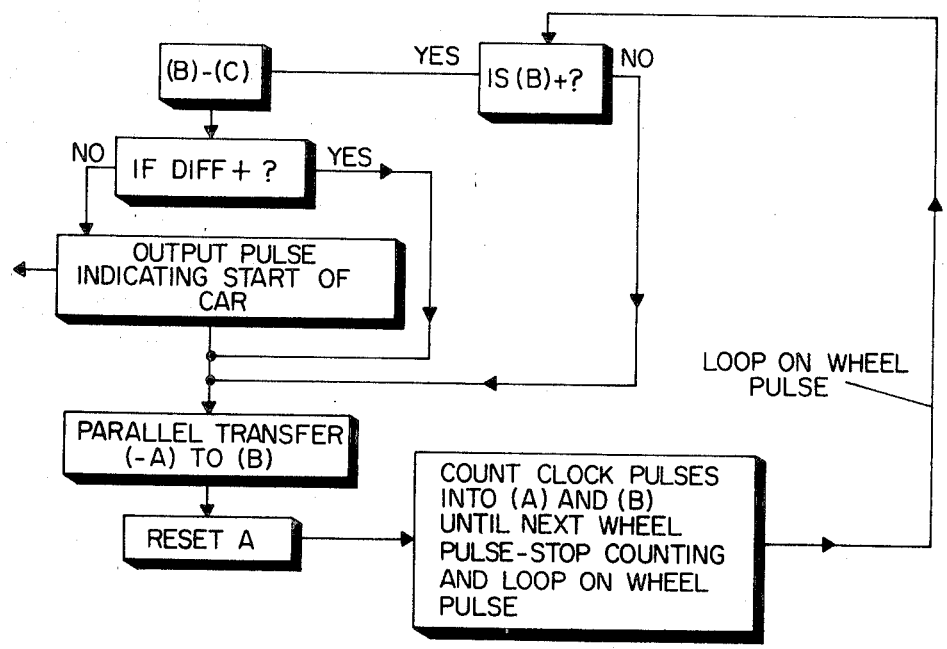
FIG. 4a is a flow diagram of how the car detector logic operates.

The car detector is shown in more detail in FIG. 4. It will be seen that this is composed of three registers A, B and C, a clock and a count control circuit together with a system control circuit. An additional subtracter B−C is shown with an output connected through an output gate to be described later. The wheel signal 34 feeds into the signal control box as indicated. Before the first wheel signal is received, the three registers A, B and C are reset to zero. When the first wheel signal is received, the system control through the count control starts counting clock pulses into the register A. At the same time clock pulses are counted into the register B. When the second wheel signal is received, the counting into the A and B registers is temporarily halted and the following procedure takes place. The contents of the B register are examined to determine if it is positive. If it is positive, the contents of the C register are subtracted from the contents of the B register by the subtracter labeled B−C. Since zero was initially loaded into the C register, the results of such a subtraction must be positive. Under this condition, there will be no output to the output gate leading to line 36. Since the contents remaining in the B register were positive, the results will be transferred to the C register. The number in the B register will now be erased and the negative of the quantity in the A register will be transferred to the B register. The count control circuit is now implemented and clock pulses are counted in the A register until the next wheel signal. During this time, both the A and the B registers are counted up. On the next wheel signal, the count procedure is stopped and the following procedure is stared.

First the contents of the B register are examined to determine whether the result is negative or positive. If it is negative, the negative of the number in the A register is transferred to the B register and the count continues without altering the C register. If, however, the B register indicates a positive B−C the B-C subtracter must perform the indicated B−C subtraction to determine the polarity of the result. Again, if the result is positive, there is no output but if it is negative, an indication is transmitted to indicate the beginning of a car over lead 36. At the end of this time, the contents of the B register are transferred to the C register and the negative of the A register is transferred to the B register and the count is resumed for the next integral. This procedure is repeated for each subsequent integral between successive wheel signals.

Referring again now to the overall system of FIG. 1, it has been seen that the output from the car detector means 32 on line 36 comprises one pulse, for example such as 100 or 104 of FIG. 3c, per each passing car and, as explained above, this pulse serves as a transfer or gating pulse for the digital heat signals of that particular car which have been stored in the holding storage means 30.

Now, all of the individual digitized heat signals for one side, such as the right side, of a given car stored in the holding storage means 30 are output along line 128 into a side averager means 130 wherein an average signal value for the individual heat signals of the car side is obtained and is output on line 132. Each of the individual heat signals for this particular side is then output once again from the holding storage means 30 along line 136. One by one, the individual heat signals on line 136 are compared with the average side signal value on line 132 in a signal comparator means 138. Any deviation of an individual heat signal from the average heat signal for that side that does not fall within predetermined, preset limits functionally designated by block 140, causes an output to occur on line 142 into an alarm output means 144. At the same time the output of car counter 42, car side monitor 43 and axle counter 44 are communicated to alarm output 144 to indicate the location of the hot box. At the same time, the actual average side value from the side averager means 130 is input via line 146 into an average comparator means 148. If the value of at least one right-side average signal and one left-side average signal available from 130 exceeds a predetermined limit as set, no heat detector malfunction signal will be transmitted over lead 163 to sound an alarm by 144 at the end of the train as indicated by the termination of wheel signals as indicated on line 34. If, however, either side fails to produce such a signal, a malfunction indication will be given. Such malfunctions as would typically affect the average comparison value are missing heat or wheel signals, system gain, and the like. As discussed above, the ability of the novel system to monitor its own operation in this fashion assures confidence in the veracity of its alarm indication, as a "checking" alarm output would otherwise occur.

After the heat signals from the right side of the individual passing car have been analyzed in this fashion, all heat signals stored in the holding storage means 30 for the left side of the car are then acted digital in the same manner and the value of the average left-side signal from the side averager means 130 is also compared in the average comparator means 148 to predetermined limits 150 to determine operability of the detecting device. Subsequently, a further set of digitized heat signals would be dumped from the heat signal digitizer means 23 into the holding storage means 30, this set of heat signals being those obtained from the next succeeding passing car. As will be recognized, the signal comparator means 138, the side averager means 130, and the average comparator means 148 may comprise conventional digital logic components.

So as to further increase the operational reliability of the novel hot box detector system, provisions are made for obtaining an alarm output signal in the event that, through malfunction, the synchronizing and transfer signal from the car detector means 32 does not occur. In this respect, an auxiliary axle comparator means 156 is "redundantly" provided, this comparator means 156 being in accordance with any typical prior-art construction whereby the difference or ratio of two successive digital signals are compared. Specifically, in the event of a malfunction of car detector means 32, digital heat signals representative of the temperature of the journal boxes on both the right and the left side of the same axle are successively output from the holding storage means 30 into the auxiliary axle comparator means 156 via line 158 wherein the ratio or difference of the signals is taken and wherein an alarm condition output is transferred via line 160 into the alarm output means 144 in the event of deviations of the comparison result from any preset limits. In this sense, then, the "redundant" portion of the novel hot box detector system of the instant invention serves to automatically switch from its preferred operation into the operation of prior-art detector systems.

Many different modes of transferring this "alarm" information to the train crew can be utilized within the overall inventive concepts expressed herein. For example, this information can be transmitted over conventional lines to a train dispatcher's office, the train dispatcher reading the information and operating certain trackside signals visually observed by the engineer of the train at some distance down the track.

A particular form of transferring alarm indicia to the train crew is preferred, however, and is described hereinbelow. The alarm output means 144 would serve to store the input alarm information and, when the train has passed by the track site location of hot box detector 22, would serve to transmit a sequential coded radio message over a schematically indicated transmission path 160 to a remote readout or printout means 162 actually carried on board the train, such remote readout means comprising a receiver and a display device. The sequential coded message transmitted by the alarm output means 144 is contemplated to contain the following information:

Start Code;
Total Number of Wheels;
Hot Box at Wheel No. ____ (right or left) side, car Number: ____ ;
Hot Box at Wheel No. ____ (right or left) side, car Number: ____ , etc..;
Detector (in or out of) order; and
Code.

This sequential code is contemplated to be transmitted over and over again such that its accuracy can be repeatedly verified on board the train. The on-board display included within the remote readout means 162 would, of course, be reset after an alarm condition has been corrected.

In the event of malfunction of the car detector means 32, information as to the car number at which an alarm has occurred cannot be transmitted to the remote readout means 162. Rather, the output of the auxiliary axle comparator means 156 and thus the transmitted output of the alarm output means 144 would merely give the axle number from the front of the train, for example, at which an alarm condition has occurred. With only this information, the train crew would have to manually count axles to the defective location.

As should now be apparent, the objects initially set forth at the outset of this specification have been successfully achieved.

What is claimed as new and desired to be secured by Letters Patent of the United States is:

1. A method of detecting the passage of a train of cars moving past a given point wherein each car comprises a plurality of trucks with each truck comprising a plurality of axle bearing wheels, said method comprising the steps of:

measuring the distance between successive wheels of the car in said train in response to the passage of the wheels past a given point;

providing a first signal representative of the passage of the first axle of each truck comprising subtracting each measured distance from the preceding measured distance and generating said first signal in response to the value of each subtraction having a given, one polarity;

and providing a second signal representative of the passage of the first axle of a car comprising subtracting each said first signal from the preceding first signal and generating said second signal in response to the value of each subtraction having a given polarity opposite to said one polarity.

2. A method of detecting the passage of a plurality of cars moving past a given point wherein each car comprises a plurality of trucks with each truck comprising a plurality of axle bearing wheels, said method comprising the steps of:

measuring the distance between successive wheels of the cars in response to the passage of the wheels past said given point;

providing a first signal representative of the passage of the first axle of the truck comprising comparing each measured distance with the preceding measured distance and generating said first signal in response to the value of each comparison exceeding a given value in a first direction;

and providing a second signal representative of the passage of the first axle of a car comprising comparing each said first signal with the preceding first signal and generating said second signal in response to the value of each comparison exceeding a given value in the opposite direction.

3. A method of detecting the passage of railroad cars each comprising a plurality of trucks wherein each truck comprises a plurality of axle bearing wheels, said method comprising the steps of:

automatically measuring the distance between successive wheels of the cars of a train in response to the passage of the wheels past a given point;

electronically comparing each measured distance with the preceding measured distance and generating a first signal representative of the value of each comparison only when it has a given polarity;

electronically comparing each first signal with the preceding first signal and generating a second signal representative of the value of each said last-named comparison only when it has a given polarity.

4. Apparatus for detecting the passage of a train of cars moving past a given point wherein each car comprises a plurality of trucks with each truck comprising a plurality of axle bearing wheels, said apparatus comprising:

means for measuring the distance between successive wheels of the car in said train in response to the passage of the wheels past a given point;

means for subtracting each measured distance from the preceding measured distance and generating a first signal representative of the value of each subtraction, means only responsive to each first signal having a given, one polarity for providing a first output signal representative of the passage of the first axle of a truck;

means for subtracting each said first signal from the preceding first signal and generating an additional signal representative of the value of said subtraction, means only responsive to each such second signal having a polarity opposite to said given one polarity for providing a second output signal representative of the passage of the first axle of a car.

5. Apparatus for detecting the passage of a plurality of cars moving past a given point wherein each car comprises a plurality of trucks with each truck comprising a plurality of axle bearing wheels, said apparatus comprising:

means for measuring distance between successive wheels of the cars in response to the passage of the wheels past said given point;

means for comparing each measured distance with the preceding measured distance and generating a first signal representative of the value of each comparison, means only responsive to each first signal having a value which exceeds a given value in a first direction for providing a first output signal representative of the passage of the first axle of a truck;

means for comparing each said first signal with the preceding first signal and generating an additional signal representative of the value of each comparison, means responsive only to each such second signal having a value which exceeds a given value in the opposite direction for providing a second output signal representative of the passage of the first axle of a car.

6. Apparatus for detecting the passage of railroad cars each comprising a plurality of trucks wherein each truck comprises a plurality of axle bearing wheels, comprising:

means for automatically measuring the distance between successive wheels of the cars of a train in response to the passage of the wheels past a given point;

means for electronically comparing each measured distance with the preceding measured distance and generating a signal representative of the value of each comparison which has a given polarity;

means for electronically comparing each said signal with the preceding signal and generating an additional signal representative of said comparison;

and means for generating an output signal corresponding to each of said additional signals which has the same polarity representing the first wheel of the first truck of each car.

7. Apparatus for detecting the passage of a train of cars moving past a given point wherein each car comprises a plurality of trucks with each truck comprising a plurality of axle bearing wheels comprising:

first, second and third counters, a source of recurrent timing pulses, means for detecting the passage of wheels past said given point, means for enabling said first counter to count the timing pulses occurring between detection of the passage of a first detected wheel and a preceding wheel to provide a first count value, means for transferring said first count value as a negative first count value to said second counter, means for enabling said first and second counters to count the timing pulses occurring between detection of the passage of a second wheel and said first wheel to obtain a second count value and the difference between said second and first count values in said first and second counters respectively, means responsive to said difference having a positive value for transferring said difference as a negative difference count to said third counter, means for operating said first and second counters to count the timing pulses occurring between detection of the passage of a third wheel and said second wheel to obtain a third count and the difference between said second and first counts in said first and second counters respectively, means operative when the difference between said third and second counts in said second counter becomes positive to operate said third counter to also count the remainder of the count being counted into said first and second counters into said third counter, and means responsive to the count in said third counter being negative at the end of said third count for utilizing said information.

8. An arrangement according to claim 7 further comprising means operative when the difference between said second and first counts is negative for resetting said second counter to zero and transferring the negative of said second count from the first counter into said second counter, and means responsive to the total count in said third counter being positive at the end of the third wheel count for resetting said third counter to zero and transferring the difference between said third and second counts as a negative difference count into said third counter.

* * * * *